United States Patent [19]

Collins

[11] Patent Number: 5,771,937
[45] Date of Patent: Jun. 30, 1998

[54] PIPE PLUG AND METHOD

[75] Inventor: Fred Collins, Corona, Calif.

[73] Assignee: MCP Industries, Inc., Corona, Calif.

[21] Appl. No.: 766,716

[22] Filed: Dec. 13, 1996

[51] Int. Cl.[6] ................................... F16L 55/12
[52] U.S. Cl. ................... 138/93; 138/89; 138/90
[58] Field of Search ................................ 138/93, 89, 90, 138/94, 89.3; 285/258; 73/49.1

[56] References Cited

U.S. PATENT DOCUMENTS

| D. 350,704 | 9/1994 | Mathison et al. ................ D10/80 |
| 1,180,282 | 4/1916 | Bunn . |
| 1,506,418 | 8/1924 | Evensta et al. . |
| 2,171,023 | 8/1939 | Buxton . |
| 2,279,257 | 4/1942 | Svirsky . |
| 2,678,666 | 5/1954 | Theis et al. . |
| 3,129,726 | 4/1964 | Moore . |
| 3,431,945 | 3/1969 | Robillard . |
| 3,802,449 | 4/1974 | Mulinex . |
| 4,021,265 | 5/1977 | Guenther . |
| 4,079,755 | 3/1978 | Van der Lans . |
| 4,080,799 | 3/1978 | Nanny ................................ 138/93 X |
| 4,283,447 | 8/1981 | Flynn . |
| 4,377,945 | 3/1983 | Di Giovanni et al. . |
| 4,423,754 | 1/1984 | Carter, Jr. . |
| 4,460,019 | 7/1984 | Condon . |
| 4,612,961 | 9/1986 | Vetter ....................................... 138/93 |
| 4,614,206 | 9/1986 | Mathison et al. ........................ 138/93 |
| 4,658,861 | 4/1987 | Roberson, Sr. ........................... 138/90 |
| 4,660,603 | 4/1987 | Tash ........................................ 138/92 |
| 4,660,644 | 4/1987 | Egnor ..................................... 166/285 |
| 4,713,870 | 12/1987 | Szalvay ..................................... 29/402 |
| 4,781,249 | 11/1988 | Wood ..................................... 166/187 |
| 4,887,931 | 12/1989 | Frisby et al. ............................ 405/171 |
| 4,895,178 | 1/1990 | McHugh ................................. 134/167 |
| 4,964,439 | 10/1990 | Vanderlans ............................... 138/93 |
| 4,967,846 | 11/1990 | Wood ..................................... 166/387 |
| 5,131,433 | 7/1992 | Sion et al. ................................ 138/93 |
| 5,240,031 | 8/1993 | Vigil ..................................... 138/93 X |
| 5,353,841 | 10/1994 | Mathison et al. ......................... 139/93 |
| 5,353,842 | 10/1994 | Lundman ................................. 138/93 |

FOREIGN PATENT DOCUMENTS

| 4-136590 A | 5/1992 | Japan ....................................... 138/93 |
| 1 511 812 | 5/1978 | United Kingdom . |

Primary Examiner—Patrick F. Brinson
Attorney, Agent, or Firm—John J. Connors; Connors & Assoc.

[57] ABSTRACT

A device for plugging a pipe includes a resilient, hollow body member that expands with the application of internally applied pressure to block the pipe. The body member has at one end a conical shaped wall with an apex that points inward. At ambient pressure, the diameter of the body member is less than the diameter of the pipe into which it is inserted. The diameter of the body member increases as the internal pressure increases, and the length of the conical shaped wall decreases.

14 Claims, 5 Drawing Sheets

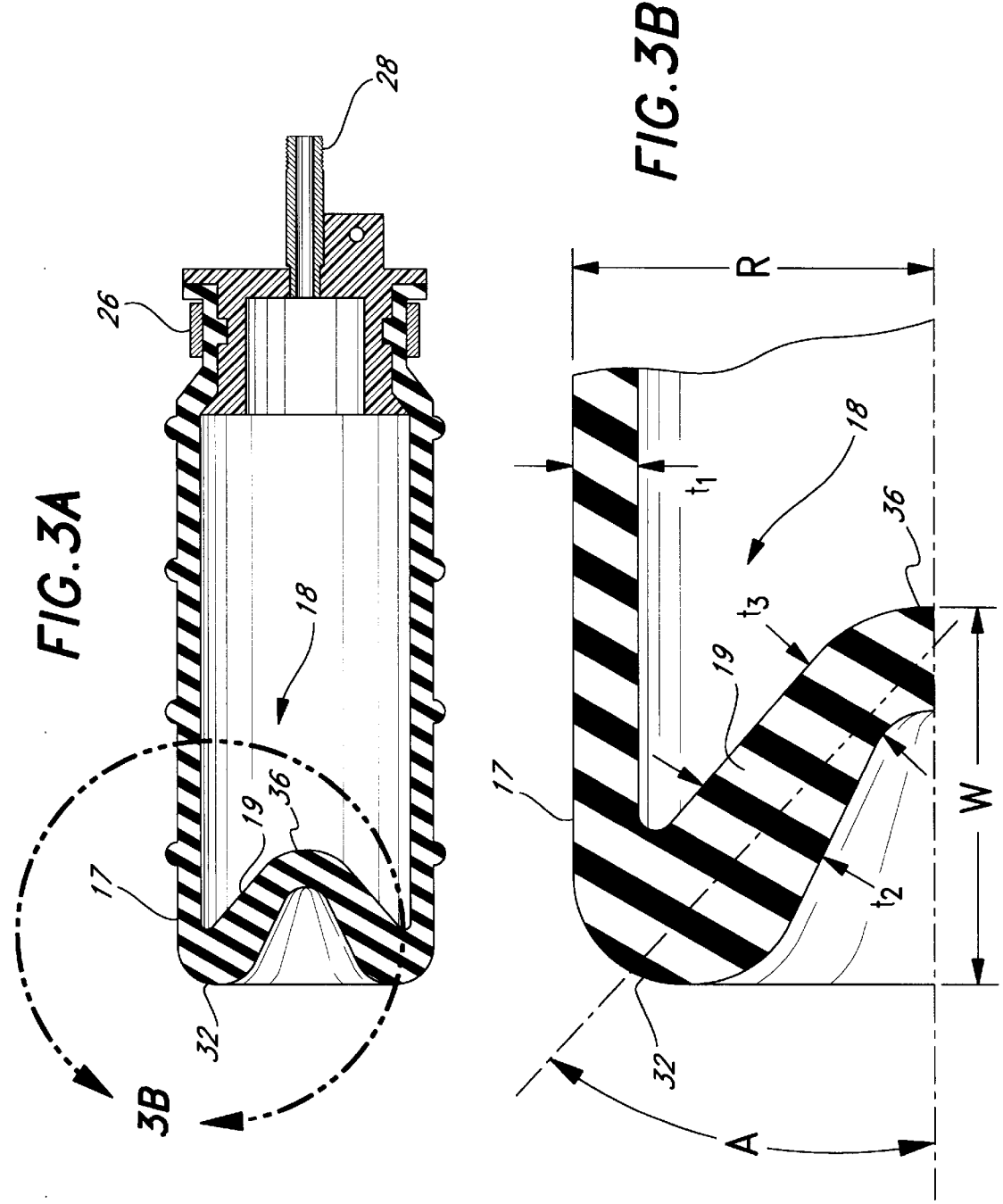

5,771,937

PIPE PLUG AND METHOD

BACKGROUND OF THE INVENTION

1. Field of the Invention

This invention relates to hydro-pneumatic pressure isolation and testing devices used to repair or evaluate plumbing installations.

2. Background Discussion

In the course of repair or installation of drain pipes, plumbers often encounter situations where they must isolate portions of the plumbing in order to repair a leaky section, or to perform a pressure test to assure a water-tight installation. Isolation is usually accomplished by inserting a temporary plug device through a clean-out pipe and activating the device, which causes it to expand and grip the interior walls of the section of pipe, thus providing a water and air tight seal. The plumber may then apply test pressure, either water or air, to the isolated section of plumbing to test for leaks, or he or she may proceed with necessary repairs of that section of plumbing. Multiple plugs are often used in complex installations to isolate fully the appropriate section of plumbing. These plug devices often consist of a hollow, sausage shaped expandable bag, with a valve on one end used to admit gas or other fluid for purposes of inflating the bag so that it expands and blocks off the pipe into which it has been inserted. Existing plugs must have enough contact with the inside wall of the pipe at rated inflation pressure to withstand the back pressure build up in the plumping being tested. Insufficient contact area could result in failure or slippage of the plug and possible serious injury to the plumber and damage to the drainage system. Numerous incremental improvements have been developed in attempts to solve the problems listed above with limited success. The new pipe plug of this invention overcomes these problems in a reliable design which is inexpensive and easy to manufacture.

SUMMARY OF THE INVENTION

It is the objective of this invention to provide an improved expandable pipe plug for isolating or pressure testing plumbing installations.

This invention has several features, no single one of which is solely responsible for its desirable attributes. Without limiting the scope of this invention as expressed by the claims which follow, its more prominent features will now be discussed briefly. After considering this discussion, and particularly after reading the section entitled, "DETAILED DESCRIPTION OF THE PREFERRED EMBODIMENT," one will understand how the features of this invention provide its benefits, which include enhanced sealing performance and safety, ease of installation, simplicity of manufacture, and low cost.

The first feature of the plug of this invention is that it is adapted to be conveniently inserted lengthwise into a pipe having a generally cylindrical inside pipe wall with a predetermined inside diameter. The plug has a generally cylindrical, resilient body member having a hollow interior and opposed first and second ends connected by an exterior wall which has an outside diameter that is less than the predetermined inside diameter of the pipe when fluid pressure in the hollow interior is at ambient pressure. The first end of the body member has a valve for introducing pressurized fluid into the hollow interior of the body member. The exterior wall may include at least one circumferentially disposed external rib to aid in creating an air and water tight seal when fluid pressure in the interior is increased substantially above ambient.

The second feature is that the second end of the body member has an end wall which closes the second end so that fluid can only escape from the hollow interior through the valve. The end wall has a perimeter which is connected to the exterior wall of the body member at the second end and projects inward terminating in a central apex. Preferably, this end wall is substantially conical in shape, and it includes a smoothly rounded transition section connecting the exterior wall to the perimeter of the conically shaped wall. The central apex is rounded. The transition section deforms and becomes thinner when the hollow interior of the body member is subjected to pressure substantially above ambient pressure. The exterior wall increases in diameter and in length to press against the inside pipe wall to create an air and water tight seal when fluid pressure in the hollow interior is increased substantially above ambient and decreases in diameter and in length when the fluid pressure is again reduced to ambient pressure.

This invention also includes a method of of blocking a pipe, which includes:

(a) inserting into the pipe a device having a resilient, hollow body member that expands with the application of internally applied pressure to block the pipe, said body member having at one end a conical shaped wall with an apex that points inward, and (b) applying internal pressure to the body member to expand the diameter of the body member to create an air and water tight seal between the body member and the pipe.

The applied pressure ranges typically from about 30 to 50 psi. The pressure is applied at or near one end of the device, and the apex points toward this end.

BRIEF DESCRIPTION OF THE DRAWING

The preferred embodiment of this invention, illustrating all its features, will now be discussed in detail. This embodiment depicts the novel and non-obvious features and method of this invention as shown in the accompanying drawing, which is for illustrative purposes only. This drawing includes the following figures (FigS.), with like numerals indicating like parts:

FIG. 3A is a cross-section view of the pipe plug of this invention in its unexpanded condition.

FIG. 3B is an enlarged fragmentary view of a section of the pipe plug of this invention taken along line 3B of FIG. 3A.

DETAILED DESCRIPTION OF THE PREFERRED EMBODIMENT

Figure 1:
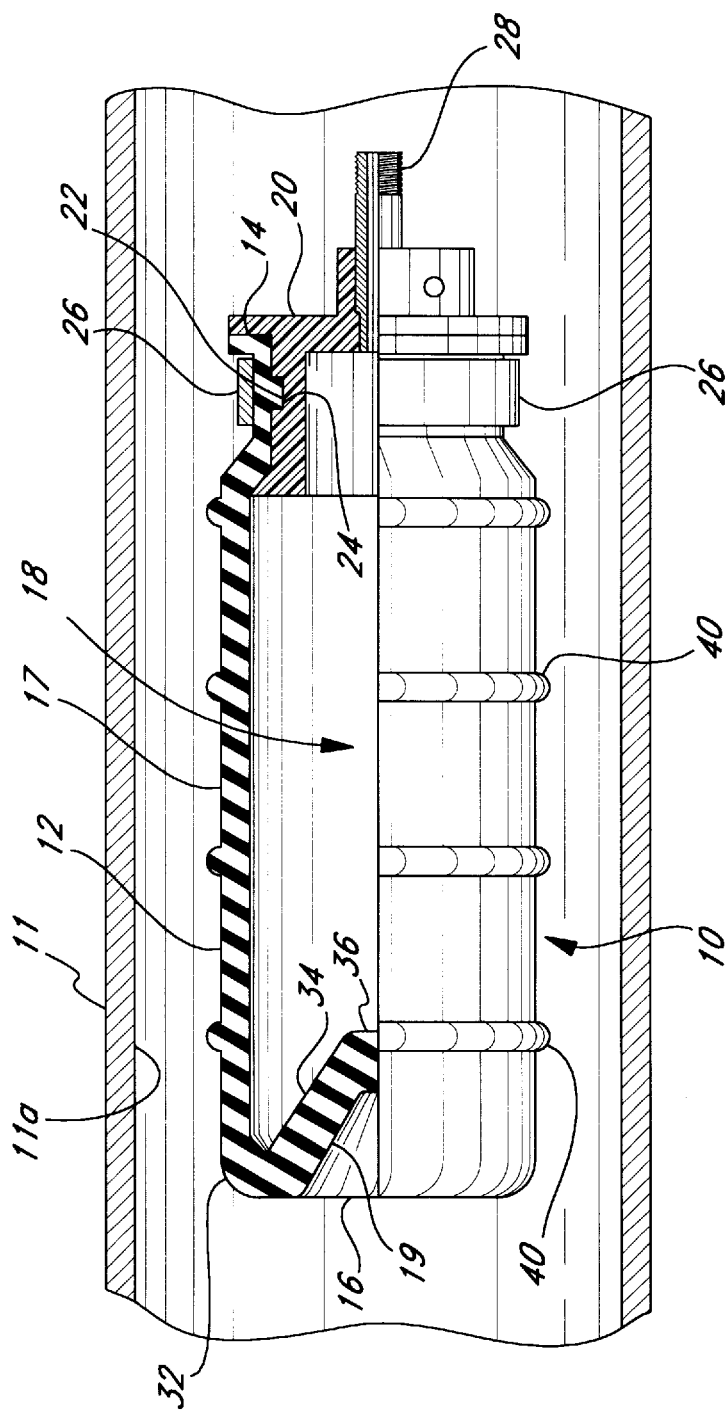
FIG. 1 is a side view, partially in cross-section, of the pipe plug of this invention in its unexpanded condition, within a typical length of plumbing pipe.

As depicted in FIG. 1, the pipe plug 10 of this invention is inserted lengthwise into a conventional plumbing pipe 11.

The pipe plug 10 includes a body member 12 composed of a pliable, elastomeric material such as rubber, for example, typically natural rubber from Malaysia. The body member 12 has a hollow interior 18 and it includes an open end 14 and a closed end 16 joined by an exterior wall 17. There are circumferential ribs 40 on the exterior wall 17 which enhance the pipe plug's resistance to slippage when in its expanded state (FIG. 2) within the plumbing pipe 11.

Figure 2:
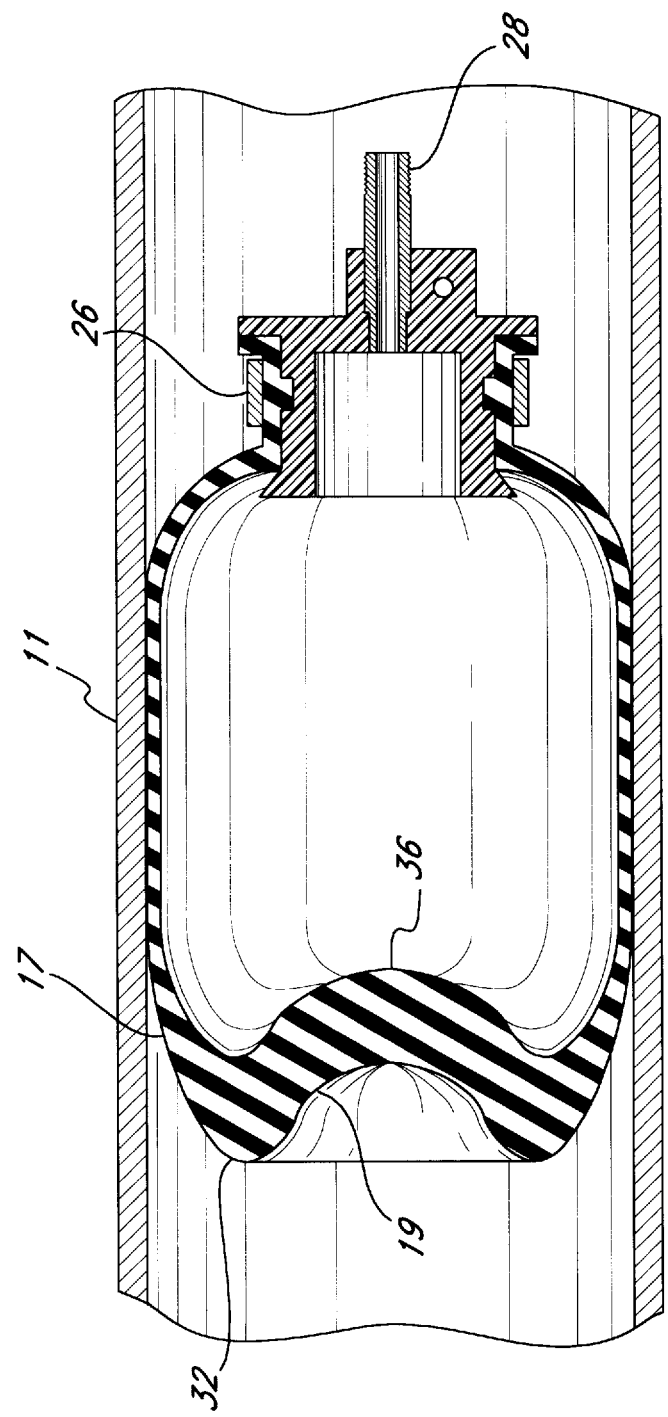
FIG. 2 is a sectional view of the pipe plug of this invention in its expanded condition, within a typical length of plumbing pipe.

A hard plastic insert 20 is inserted into the open end 14. This insert 20 has an annual groove 24 around its exterior. Near the end 14 on the inside of the the exterior wall 17 is an annular interlocking tongue 22 which fits into the groove 24. Air tight engagement is maintained by a band clamp 26 seated in a depression 17a in the exterior wall 17 near the open end 14. The band clamp 26 surrounds the insert 20 and presses the exterior wall 17 against the insert. A conventional tire inflation valve 28 is installed near the center of the insert 20, providing the only means for admitting pressurized gas into the interior 18. Normally pressure within the interior 18 of the pipe plug 10 is at ambient pressure and the plug is in the unexpanded condition shown in FIG. 1. As shown in FIG. 2, when gas at approximately 40 pounds per square inch (psi) is admitted into the hollow interior 18 through the valve 28, the body member 12 expands until the exterior wall 17 presses against the internal surface 11a of the wall of the pipe 11.

The closed end 16 consists of a wall 19 which provides a gas tight seal. As can best be seen in FIGS. 2 and 3, the wall 19 is substantially conical in shape, with a rounded transition section 32 connected to the exterior wall 17 at the base or perimeter of the conical wall 19. A thickened connecting section 34 attaches the transition section 32 to a rounded cone apex 36. The cone apex 36 points inward toward the open end 14. The rounded transition section 32, the connecting section 34, and the cone apex 36 are all composed of the same elastomeric material as the body member 12.

As best shown in FIG. 3A, the thickness $t_2$ of the transition section 32 is greater than the thickness $t_3$ of the connecting section 34, and the thickness $t_2$ and $t_3$ of both these sections 32 and 34 are greater than the thickness $t_1$ of the exterior wall 17. These different thicknesses are specifically designed to distort the closed end 16 in a predetermined manner as the body member 12 is inflated. This desired distortion results in the progressive reduction in height (w) of the conical wall 19 as the rounded transition section 32 straightens out and presses against the inner wall 11a of the pipe 11 to form a sealing area 38. That is, the distance (W) between the cone apex 36 and the perimeter of the conical wall or rounded transition section 32 decreases proportionally as the length of the exterior wall 17 increases with expansion of the pipe plug 10, resulting in a lengthening of the sealing area 38. At the time the rounded transition section 32 moves radially outward toward the pipe inner wall 11a.

Figure 3:
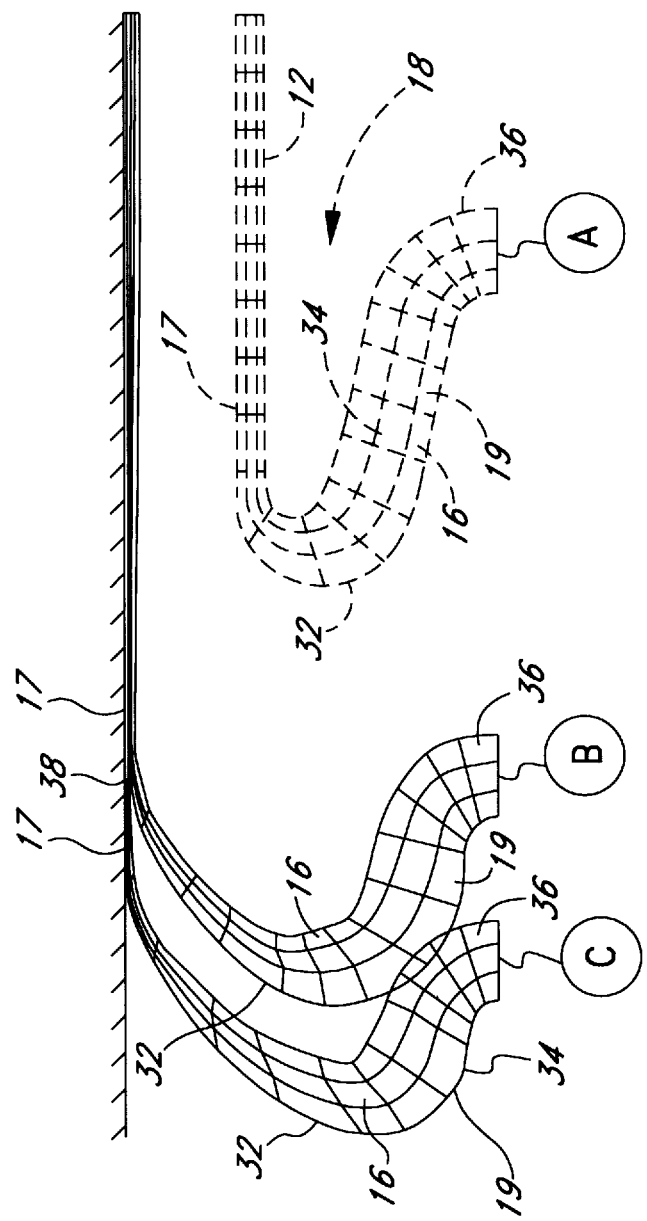
FIG. 3 is schematic view illustrating a multiple close-up, half-sectional view of the pipe plug of this invention within a typical length of plumbing pipe, showing the shape of the conical end wall when the plug is uninflated, when the plug is at the rated inflation pressure, and when the plug is at the rated inflation pressure but exposed to normal back-pressure from the plumbing being tested.
Figure 4:
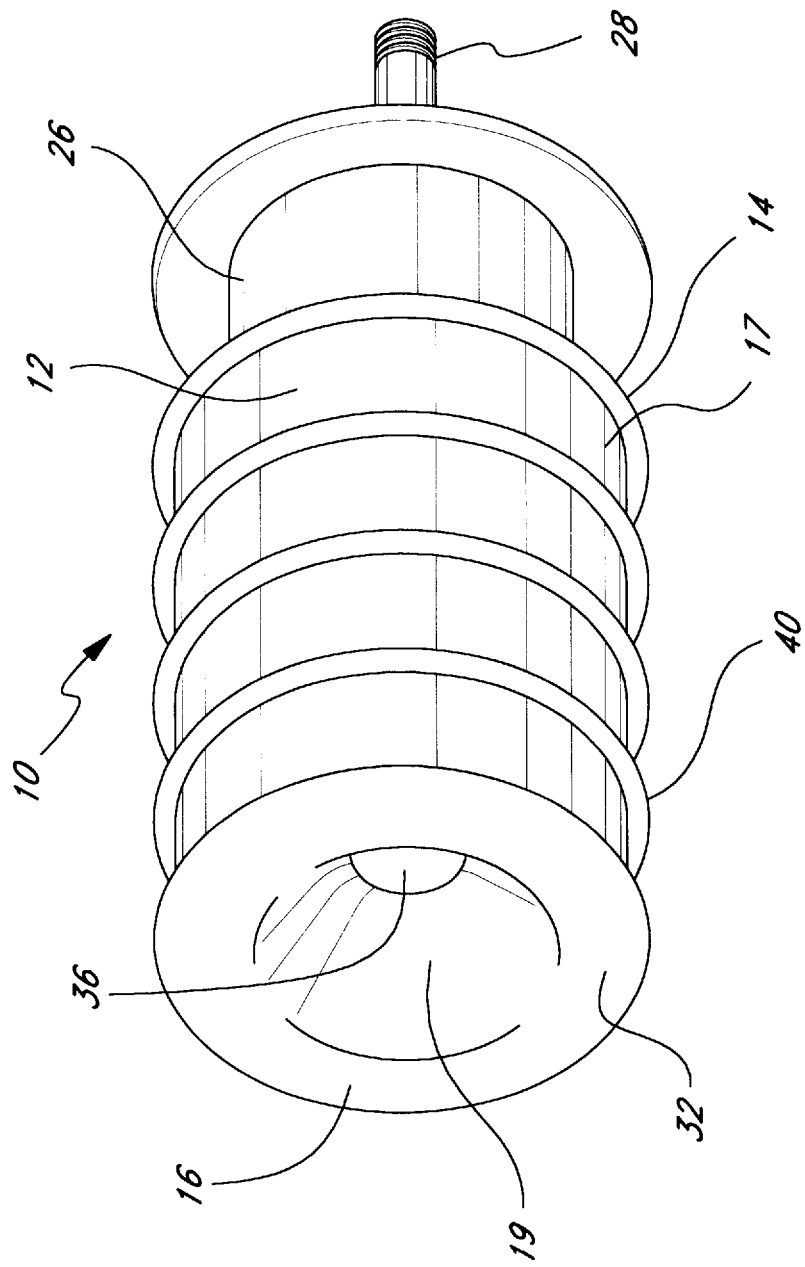
FIG. 4 is a perspective view of the pipe plug of this invention, showing the external circumferential ribbing incorporated to aid in sealing when back pressure is applied.

This progressive distortion is illustrated in FIG. 3. Position A shows the transition section 32 before the expansion of the pipe plug 10. Position B shows the transition section 32 where the applied internal pressure is 40 psi and the back pressure within the pipe 11 is 13 psi. Position C shows the transition section 32 where the applied internal pressure is 40 psi and the back pressure within the pipe 11 is at ambient pressure. The transition section 32 stretches and becomes thinner as the diameter of the body member increases with increasing pressure, and the height of the conical wall 19 decreases proportionally.

As air under pressure enters the hollow interior 18 via the valve 28, the exterior wall 17 lengthens axially and moves radially outward as shown in FIG. 3 until it contacts with the pipe inner wall 11a. The transition section 32 will be stretched, will thin, and will be moved radially. This radial motion will occur relatively easily, allowing the exterior wall 17 to contact the pipe inner wall 11a. This radial growth of the transition section 32 is accompanied by a shortening of the cone height, i. e., the length W.

Consider, for example, the special case of the angle A in FIG. 3A equal to 90 degrees. In other words, if no conical wall 19 was used, but the end is simply a flat disk. In this case, the transition section 32, the conical wall 19, and the cone apex 36 are all vertical, forming a simple disk of uniform wall thickness. In this case, the transition section 32 will not move radially easily. Consequently, a flat disk inhibits the wall 17 from contacting the pipe inner wall 11 a. In testing it was found that a cone angle A of about 10 to 15 degrees is preferred. If larger, the conical wall 19 will tend to pop out to the left as shown in FIG. 3A. This is an indication of significant over inflation. The conical wall 19, as it is designed, will pop out at about 1.5 to 2 times the rated air inflation pressure. If the angle is less, the conical wall 19 is not as efficient. It has been found that with a cone angle A of about 10 to 15 degrees, the maximum contact of exterior wall 17 with the pipe inner wall 11a is achieved without imposing an excessive strain on the rubber forming the body member 12. It was also found that best results are achieved when the ratio of radius to height of the conical wall 19 (R/W) is about 1.3 to 1.4 and $t_2$ is greater than $t_3$, and both $t_2$ and $t_3$ are both greater than $t_1$. Under these conditions, the sealing area 38 is about 25% longer than when using a flat disk structure as opposed to the conical wall 19.

SCOPE OF THE INVENTION

The above presents a description of the best mode contemplated of carrying out the present invention, and of the manner and process of making and using it, in such full, clear, concise, and exact terms as to enable any person skilled in the art to which it pertains to make and use this invention. This invention is, however, susceptible to modifications and alternate constructions from that discussed above which are fully equivalent. Consequently, it is not the intention to limit this invention to the particular embodiment disclosed. On the contrary, the intention is to cover all modifications and alternate constructions coming within the spirit and scope of the invention as generally expressed by the following claims, which particularly point out and distinctly claim the subject matter of the invention:

I claim:

1. A pipe plug adapted to be inserted into a pipe having a generally cylindrical inside pipe wall with a predetermined inside diameter, including a generally cylindrical, resilient body member having a hollow interior and opposed first and second ends connected by an exterior wall which has an outside diameter that is less than said predetermined inside diameter of the pipe when pressure in said hollow interior is at ambient pressure, the first end of the body member having a valve for introducing pressurized fluid into the hollow interior of the body member, the second end of the body member having an end wall which closes said second end so that fluid can only escape from the hollow interior through the valve, said end wall being substantially conical in shape and having a central apex and a perimeter which is connected to the exterior wall of the body member at said second end, said apex projecting inward, said exterior wall increasing in diameter and in length to press against the inside pipe wall to create a seal when fluid pressure in the hollow interior is increased substantially above ambient and decreasing in diameter and in length when said fluid pressure is again reduced to ambient pressure said end wall including a smoothly rounded transition section connecting said exterior wall to the perimeter of said conically shaped wall and the central apex, with the transition section deforming and becoming thinner when the hollow interior of said body member is subjected to pressure substantially above ambient pressure.

2. The pipe plug of claim 1 where said exterior wall of said body member includes at least one circumferentially disposed external ribs to aid in creating a water tight seal when fluid pressure in the interior is increased substantially above ambient.

3. The pipe plug of claim 1 where said conically shaped end wall has a cone angle of from 10 to 15 degrees.

4. The pipe plug of claim 1 where the ratio of radius to height of the conically shaped end wall is about 1.3 to 1.4.

5. The pipe plug of claim 1 where transition section has a thickness greater than the thickness of a connecting section between the transition section and the central apex, and the thicknesses of both the transition section and connecting section are greater than the thickness of the exterior wall.

6. A device for plugging a pipe having a resilient, hollow body member that expands with the application of internally applied pressure to block the pipe, said body member having at one end a conical shaped wall with an apex that points inward, said conical shaped wall including a transition section connecting an exterior wall of the body member to a perimeter of said conically shaped wall, with the transition section deforming and becoming thinner when the hollow interior of said body member is subjected to pressure substantially above ambient pressure.

7. A pipe plug adapted to be inserted into a pipe having a generally cylindrical inside pipe wall with a predetermined inside diameter, including a generally cylindrical body member having a hollow interior and opposed first and second ends connected by an exterior wall, said body member being made of a resilient material, the first end of the body member having a valve for introducing pressurized fluid into the interior of the body member, the second end of the body member having a wall which closes said other end so that fluid can only escape from the interior through the valve, said wall having a substantially conical configuration with an apex that points inward towards the hollow interior and a perimeter which is connected to the exterior wall of the body member, said perimeter and apex being spaced apart by a predetermined distance, said conically shaped wall including a transition section connecting said exterior wall to the perimeter of said conically shaped wall, with the transition section deforming and becoming thinner when the hollow interior of said body member is subjected to pressure substantially above ambient pressure, when the fluid pressure in the interior is at ambient, said body member has an outside diameter which is less than said predetermined inside diameter of the pipe, and when the fluid pressure in the interior is substantially above ambient, said outside diameter increases so that the exterior wall presses against the inside pipe wall to create a seal, with said exterior wall increasing in length and the distance between the perimeter of the conical wall and the apex decreasing in direct proportion to the increase in the length of the exterior wall.

8. The pipe plug of claim 7 where said exterior wall of said body member includes at least one circumferentially disposed external ribs to aid in creating a water tight seal when fluid pressure in the interior is increased substantially above ambient.

9. The pipe plug of claim 7 where said conically shaped end wall has a cone angle of from 10 to 15 degrees.

10. The pipe plug of claim 7 where the ratio of radius to height of the conically shaped end wall is about 1.3 to 1.4.

11. The pipe plug of claim 7 where transition section has a thickness greater than the thickness of a connecting section between the transition section and the central apex, and the thicknesses of both the transition section and connecting section are greater than the thickness of the exterior wall.

12. A method of blocking a pipe, including (a) inserting into the pipe a device having a resilient, hollow body member that expands with the application of internally applied pressure to block the pipe, said body member having an exterior wall and at one end a conical shaped wall with a perimeter connected to the exterior wall and an apex that points inward, said conical shaped wall including a transition section connecting said exterior wall to said perimeter of the conically shaped wall, with the transition section deforming and becoming thinner when the hollow interior of said body member is subjected to pressure substantially above ambient pressure, and (b) applying internal pressure to the body member to expend the diameter of the body member to create a seal between the body member and the pipe.

13. The method of claim 7 where the applied pressure ranges from 30 to 50 psi.

14. A pipe plug device including a resilient, hollow body member having opposed ends connected by an exterior wall, said body member expanding with the application of internally applied pressure to block the pipe and contracting when said applied pressure is removed, and a conical shaped end wall at one end having a perimeter and a central apex that points inward and a valve near the other end for introducing fluid into and removing fluid from said hollow body member, said conical shaped end wall including a transition section connecting said exterior wall to the perimeter of said conically shaped wall, with the transition section deforming and becoming thinner when the hollow interior of said body member is subjected to an internal pressure substantially above ambient pressure and contracting and becoming thicker when said internal pressure is reduced.

* * * * *